US008437758B2

(12) United States Patent
Zuniga et al.

(10) Patent No.: US 8,437,758 B2
(45) Date of Patent: May 7, 2013

(54) METHOD AND APPARATUS FOR PERFORMING MEDIA INDEPENDENT HANDOVER MEASUREMENT AND REPORTING

(75) Inventors: Juan Carlos Zuniga, Ville St. Laurent (CA); Khalid S. Hossain, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 727 days.

(21) Appl. No.: 12/115,810

(22) Filed: May 6, 2008

(65) Prior Publication Data

US 2008/0280614 A1 Nov. 13, 2008

Related U.S. Application Data

(60) Provisional application No. 60/917,540, filed on May 11, 2007.

(51) Int. Cl.
*H04W 36/00* (2009.01)
*H04W 4/00* (2009.01)

(52) U.S. Cl.
USPC .............................. 455/437; 370/331; 455/436

(58) Field of Classification Search ................. 370/335, 370/336, 337; 455/436, 437, 438
See application file for complete search history.

(56) References Cited

U.S. PATENT DOCUMENTS

| 7,483,984 | B1 | 1/2009 | Jonker et al. |
| 7,558,544 | B2 * | 7/2009 | Kim et al. ...................... 455/132 |
| 7,616,956 | B2 * | 11/2009 | Olvera-Hernandez et al. ........... 455/436 |
| 7,649,867 | B2 * | 1/2010 | Kim et al. ...................... 370/331 |
| 7,710,930 | B2 | 5/2010 | Kwak |
| 7,738,871 | B2 * | 6/2010 | Olvera-Hernandez et al. ........... 455/436 |
| 7,778,226 | B2 * | 8/2010 | Rayzman et al. .............. 370/337 |
| 7,869,378 | B2 * | 1/2011 | Livet et al. ...................... 370/252 |
| 2006/0187882 | A1 | 8/2006 | Kwak et al. |
| 2006/0218271 | A1 | 9/2006 | Kasslin et al. |
| 2006/0246904 | A1 | 11/2006 | Olvera-Hernandez et al. |
| 2006/0251100 | A1 | 11/2006 | Kim et al. |
| 2006/0277298 | A1 | 12/2006 | Kim et al. |
| 2008/0304453 | A1 * | 12/2008 | Zuniga et al. .................. 370/331 |

OTHER PUBLICATIONS

Taniuchi et al., "IEEE 802.21: Media Independent Handover: Features, Applicability, and Realization", p. 112-119, IEEE Communications Magazine (Jan. 2009).*
Carlton et al., "IEEE 802.21 Media Independent Handover; Functions and Services Specifications," (Jan. 9, 2005).
Cypher et al., "IEEE 802.21 MIHS: Primitives and Parameter Mappings," 21-07-0056-00-0000 (Mar. 15, 2007).
Taniuchi, "IEEE 802.21 MIHS: MIH_Configure_Link," 21-07-xxxx-00-0000 (Apr. 27, 2007).

(Continued)

*Primary Examiner* — Anthony Addy
*Assistant Examiner* — Michael S Bush
(74) *Attorney, Agent, or Firm* — Volpe and Koenig, P.C.

(57) ABSTRACT

The method and apparatus are used for media independent handover (MIH) measurement and reporting in wireless communications. A periodicity for measurement and reporting is set on the MIH function through an MIH protocol message or an MIH SAP primitive and on the link layer device through an MIH_LINK_SAP primitive. A new MIH_SAP primitive, MIH protocol message or MIH_LINK_SAP primitive is added to configure the periodicity. A new information element (IE) field for measurement reporting period may be added.

10 Claims, 4 Drawing Sheets

700

| DESTINATION IDENTIFIER | LINK IDENTIFIER | CONFIGURE REQUEST LIST | REPORTING PERIOD |

OTHER PUBLICATIONS

Guo et al., "Suggestion about link parameters report," IEEE 802.21 Media Independent Handover, (Jan. 10, 2007).

Kwak et al., "IEEE P802.11 Wireless LANs: Proposed Normative Text for Repeated Measurement Request Frames," IEEE 802.11-05/0071r0 (Jan. 20, 2005).

Lan Man Standards Committee of the IEEE Computer Society, "Draft Standard for Local and Metropolitan Area Networks: Media Independent Handover Services", IEEE P802.21/D05.00, (Apr. 2007).

Lan Man Standards Committee of the IEEE Computer Society, "Draft Standard for Local and Metropolitan Area Networks: Media Independent Handover Services", IEEE P802.21/D04.00, (Feb. 2007).

Lan Man Standards Committee of the IEEE Computer Society, "Draft Standard for Local and Metropolitan Area Networks: Media Independent Handover Services", IEEE P802.21/D8.0, (Dec. 2007).

Lan Man Standards Committee of the IEEE Computer Society, "Draft Standard for Local and Metropolitan Area Networks: Media Independent Handover Services", IEEE P802.21/D9.1, (Mar. 2008).

Lan Man Standards Committee of the IEEE Computer Society, "Draft Standard for Local and Metropolitan Area Networks: Media Independent Handover Services", IEEE P802.21/D03.00, (Dec. 2006).

Taniuchi et al., "IEEE 802.21: Media Independent Handover: Features, Applicability, and Realization," p. 112-119, IEEE Communications Magazine (Jan. 2009).

Taniuchi, "IEEE 802.21 MIHS: MIH_Configure_Link," (Apr. 27, 2007).

Xie et al., "Comments #4155/4156/4158/4172/4177/4179/4243/4265/4269/4271/4447—Issues with definition and usage of link parameters, link states, QoS parameters," IEEE 802.21 MIHO (May 2007).

Xie et al., "Comments #4155/4156/4158/4172/4177/4179/4243/4265/4269/4271/4447—Issues with definition and usage of link parameters, link states, QoS parameters," IEEE 802.21 MIHO (Mar. 2007).

Xie et al., "IEEE 802.21 MIHO: Issues with Definition and Usage of Link Parameters, Link States, QoS Parameters," (Mar. 2007).

Zuniga et al., "IEEE P802.21/D05.00, Draft IEEE Standard for Local and Metropolitan Area Networks: Media Independent Handover Services; Normative Text Proposal Enhancing Periodic Measurement Reports," IEEE 802.21-07/0162r0 (May 14, 2007).

* cited by examiner

METHOD AND APPARATUS FOR PERFORMING MEDIA INDEPENDENT HANDOVER MEASUREMENT AND REPORTING

CROSS REFERENCE TO RELATED APPLICATION

This application claims the benefit of U.S. Provisional Application No. 60/917,540 filed on May 11, 2007, which is incorporated by reference as if fully set forth.

TECHNOLOGY FIELD

The method and apparatus are related to wireless communication systems. More particularly, a method and apparatus for media independent handover (MIH) measurement and reporting in a wireless communication system are disclosed.

BACKGROUND

The IEEE 802.21 standard provides a uniform set of functionalities that help enable and enhance handovers across different link layer technologies. In particular, IEEE 802.21 defines a media independent handover (MIH) function (MIHF) which resides in communications entities of several wireless systems capable of supporting inter-system handover.

At a high level, the enhanced handover capability involves an upper layer MIH User which can communicate with an MIH Function, either locally or remotely, over a transport medium. The MIH Function, in turn, interacts with link-layer devices through the use of technology-specific primitives.

Of particular relevance is the capability of an MIH User to acquire measurement reports from an MIH Function and the capability of an MIH Function to acquire measurement reports from the link layer devices through the use of standardized MIH primitives.

These measurement reports can be either obtained either locally on a mobile terminal, or remotely through the use of MIH Protocol Messages. These measurement reports form a key part in the decision-making process for handovers.

While the current specification of 802.21 provides mechanisms to obtain such measurement reports, the mechanisms have deficiencies that deprive implementers from the use of key functionality and complete control of the measurement-reporting process.

According to the draft version of the IEEE 802.21 standards, the following primitives and corresponding protocol messages are used by the MIH User to acquire measurement reports from an MIH Function that may be collocated or be a remote peer. The MIH_Link_Get_Parameters Request/Response primitive unconditionally provides the value of a parameter being requested by the MIH User. The report of the parameter is made through the use of the response message. The MIH_Link_Configure Request/Response allows configuration of thresholds such that when these preset thresholds are crossed, the MIHF provides the requesting MIH User with indications through the use of MIH_Link_Parameters_Report Indication. The MIHF uses the MIH_Link_Parameters_Report Indication primitive, once certain preset thresholds are crossed, to provide an indication to the MIH User that had set the thresholds. The indication contains values for the parameter on which the thresholds have been set.

Similarly, the MIHF is also provided with primitives to acquire values for various parameters from the local link layer devices. The Link_Get_Parameters Request/Response primitive unconditionally provides the value of a parameter being requested by the MIH Function. The report of the parameter is made through the use of the response message. The Link_Configure_Thresholds Request/Response primitive allows configuration of thresholds such that when these preset thresholds are crossed, the link layer device provides the requesting MIH Function with indications through the use of Link_Parameters_Report Indication. The link layer device uses the Link_Parameters_Report Indication primitive, once certain preset thresholds are crossed, to provide an indication to the MIH Function that had set the thresholds. The indication contains values for the parameter on which the thresholds had been set.

Currently, these messages only allow one-time reports, which result in less flexibility and control of the measurement-reporting process. Periodic measurement reports are not possible through the functionalities currently provided by the IEEE 802.21 draft standard. The MIH User cannot configure a reporting period on the MIH Function (either local or remote peer). Similarly, the MIH Function cannot configure a reporting period on a link layer device using the primitives presently available in IEEE 802.21.

In addition, the current IEEE 802.21 draft specifications have some further deficiencies as follows. The first deficiency is that the MIH Function cannot clear reporting conditions previously configured on the link layer devices. Secondly, the MIH Function cannot disable measurement-reporting from link layer devices. A third deficiency is that the MIH User cannot clear reporting conditions previously configured on an MIH Function (local or remote). Finally, the MIH User cannot disable measurement-reporting from an MIH Function (local or remote).

It would be desirable to efficiently resolve these deficiencies through minimal impact on the current IEEE 802.21 standard draft specifications. It would also be desirable to incorporate a solution to the existing IEEE 802.21 messages and primitives.

SUMMARY

The method and apparatus are used for MIH measurement and reporting in wireless communications. The method includes an MIH user, an MIH function and a link layer device. A periodicity for measurement and reporting is set on the MIH function through an MIH protocol message or an MIH_SAP primitive and on the link layer device through an MIH_LINK_SAP primitive. A new MIH_SAP primitive, MIH protocol message or MIH_LINK_SAP primitive can be added to configure the periodicity. A new information element (IE) field for measurement reporting period may be added.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION

When referred to hereafter, the terminology "wireless transmit/receive unit (WTRU)" includes but is not limited to a user equipment (UE), a mobile station (STA), a mobile node (MN), a fixed or mobile subscriber unit, a pager, a cellular telephone, a personal digital assistant (PDA), an MIH function, a computer, or any other type of user device capable of operating in a wireless environment. When referred to hereafter, the terminology "access point (AP)" includes but is not limited to a Node-B, a site controller, base station, a point of attachment (PoA), a point of service (PoS), an MIH function, or any other type of interfacing device capable of operating in a wireless environment.

Figure 1:
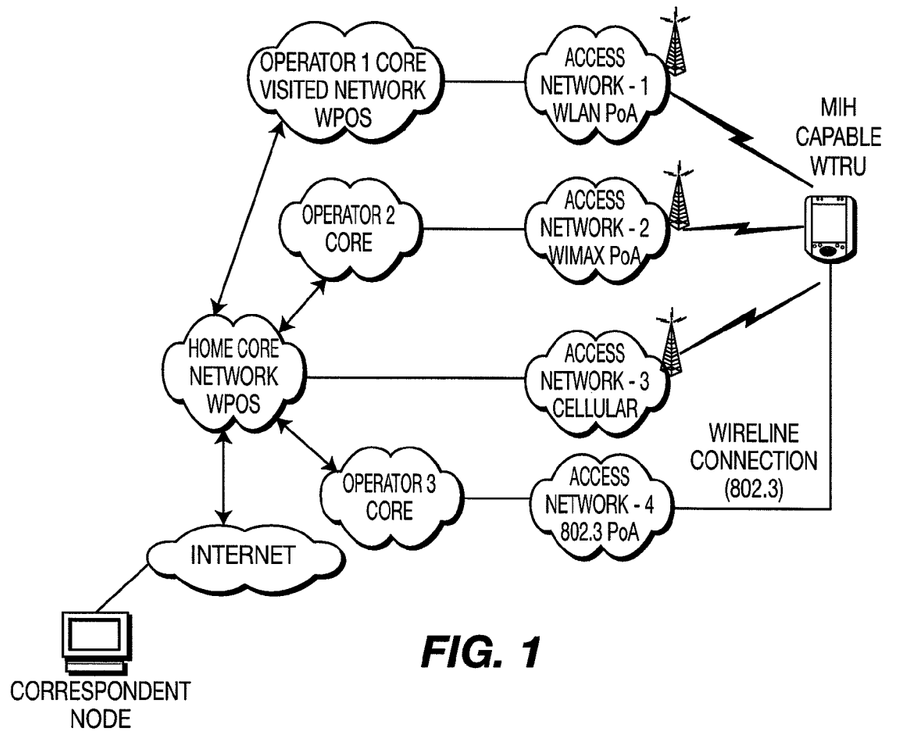
FIG. 1 is an example of a wireless communication system configured to support intersystem handover.

FIG. 1 shows an example of network architecture for wireless systems capable of supporting inter-system handover. These underlying technologies may include for example 3GPP, 3GPP2 and IEEE-based networks such as IEEE 802.xx, code division multiple access (CDMA) 2000; universal mobile telephone system (UMTS), GSM, long term evolution (LTE) or any other wireless communication system including future wireless communication systems not yet developed.

Figure 2:
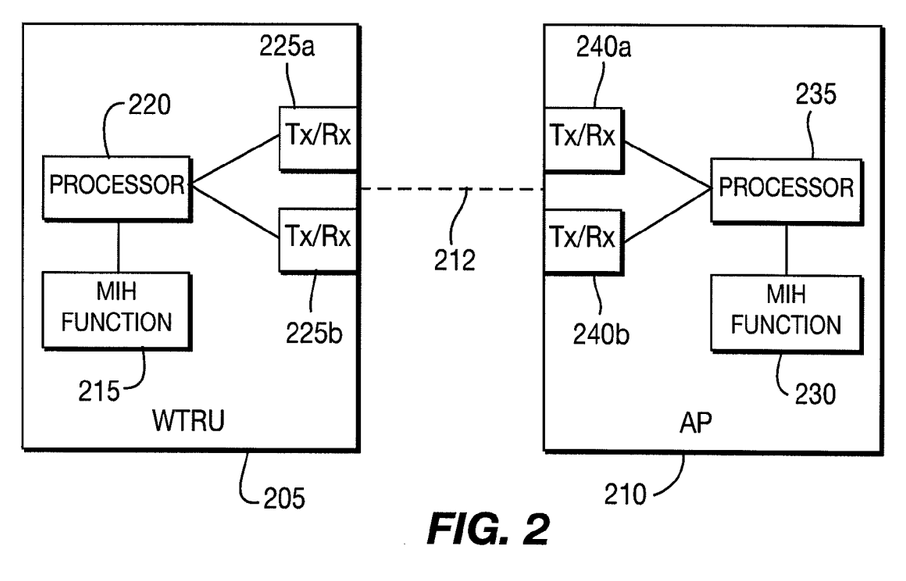
FIG. 2 is a block diagram of a typical wireless communication system.

FIG. 2 is a block diagram of a wireless communication system 200 including a wireless transmit receive unit 205 and an AP 210. The WTRU 205 and the AP 210 communicate via a wireless communication link, 212.

As shown in FIG. 2, the WTRU 215 includes an MIHF 215, a processor 220, at least one transceiver (225a, 225b). The processor 220 is attached to the MIHF 215 and each of the transceivers 225a, 225b. The MIHF 215 is configured to carry out media independent handover related processes, including processing an MIH protocol message, generating and sending an MIH measurement report, and acquiring measurement reports from link layer devices.

Also shown in FIG. 2, the AP 210 includes an MIHF 230, a processor 235, at least one transceiver (240a, 240b). The processor 235 is attached to the MIH function 215 and each of the transceivers 225a, 225b. The MIHF 230 is configured to carry out media independent handover related processes, including processing an MIH protocol message, generating and sending an MIH measurement report, and acquiring measurement reports from link layer devices. Optionally, the MIHF 230 may be located outside of the AP 210 in the network (not shown). For example, the AP 210 may be connected to an access router (not shown) which may house the MIHF 230.

Overview of the Suggested Solution

In order to solve the problems associated with the missing functionalities described above, the examples discussed below define a mechanism to set a periodicity on the MIH Function through an MIH protocol message or an MIH_SAP primitive, and a mechanism to set a periodicity on the link-layer device through an MIH_LINK_SAP primitive.

Any such mechanism should allow communication of a common reporting interval between two entities, allow reporting intervals to be associated with thresholds for reporting of one or more parameters, allow reporting intervals to be associated with unconditional probes for the reporting of one or more parameters, allow one-time reports for both thresholds and unconditional probes for measurements, cause minimal disturbance to existing primitives and messages, add minimal overhead in protocol messages, and allow vendor-specific implementation while maintaining a standard framework for modules from different sources to talk in a "common language."

These mechanisms may be implemented in one or more of the following ways. The first implementation may add a new MIH_SAP primitive, MIH Protocol message, and an MIH_LINK_SAP primitive to configure reporting time intervals. A second implementation may add an IE field for "measurement-reporting period" to the MIH_Link_Get_Parameters Request/Response primitive, and/or the Link_Get_Parameters Request/Response primitive. A third implementation may add an IE field for "measurement-reporting period" to the MIH_Link_Configure Request/Response primitive, and/or the Link Configure Thresholds Request/Response primitive.

In order to address the deficiency in terms of lack of mechanisms to remove reporting conditions previously set on a link layer device, and of mechanisms to stop further measurements being sent, a mechanism for the MIH Function to unconditionally remove or clear any previous conditions for measurement-reporting that had been set on a link layer device may be implemented. Additionally, a mechanism for the MIH Function to unconditionally enable periodic measurement reports from link layer devices may also be implemented.

Corresponding mechanisms should also be incorporated between the MIH User and the MIH Function. A mechanism for the MIH User to unconditionally remove or clear any previous conditions for measurement-reporting that had been set on an MIH Function may be incorporated. In addition, a mechanism for the MIH User to unconditionally enable or disable periodic measurement reports from an MIH Function may also be incorporated.

These mechanisms can be incorporated into the 802.21 draft standard by adding the various types of Link Action. These types of Link Action include LINK_CLEAR_THRESHOLDS, LINK_DISABLE_PARAMETERS_REPORTS, and LINK_ENABLE_PARAMETERS_REPORTS.

Configuring a Measurement Report on the MIH Function

This section shows two examples of how to incorporate the mechanism described above into existing MIH protocol messages and MIH_SAP primitives. It is understood that corresponding messages, mapping directly to the primitives discussed below, can be generated and transmitted to remote destinations.

Changing MIH Link Get Parameters Behavior

The existing MIH_Link_Get_Parameters request primitive is described as:

```
MIH_Link_Get_Parameters.request (
    DestinationIdentifier,
    DeviceStatesRequest,
    LinkIdentifierList,
    GetStatusRequestSet
)
```

In order to implement periodic reporting in the present example, the existing primitive definition is updated to include a ReportingPeriod field:

```
MIH_Link_Get_Parameters.request (
    DestinationIdentifier,
    DeviceStatesRequest,
    LinkIdentifierList,
    GetStatusRequestSet,
    ReportingPeriod
)
```

Figure 3:
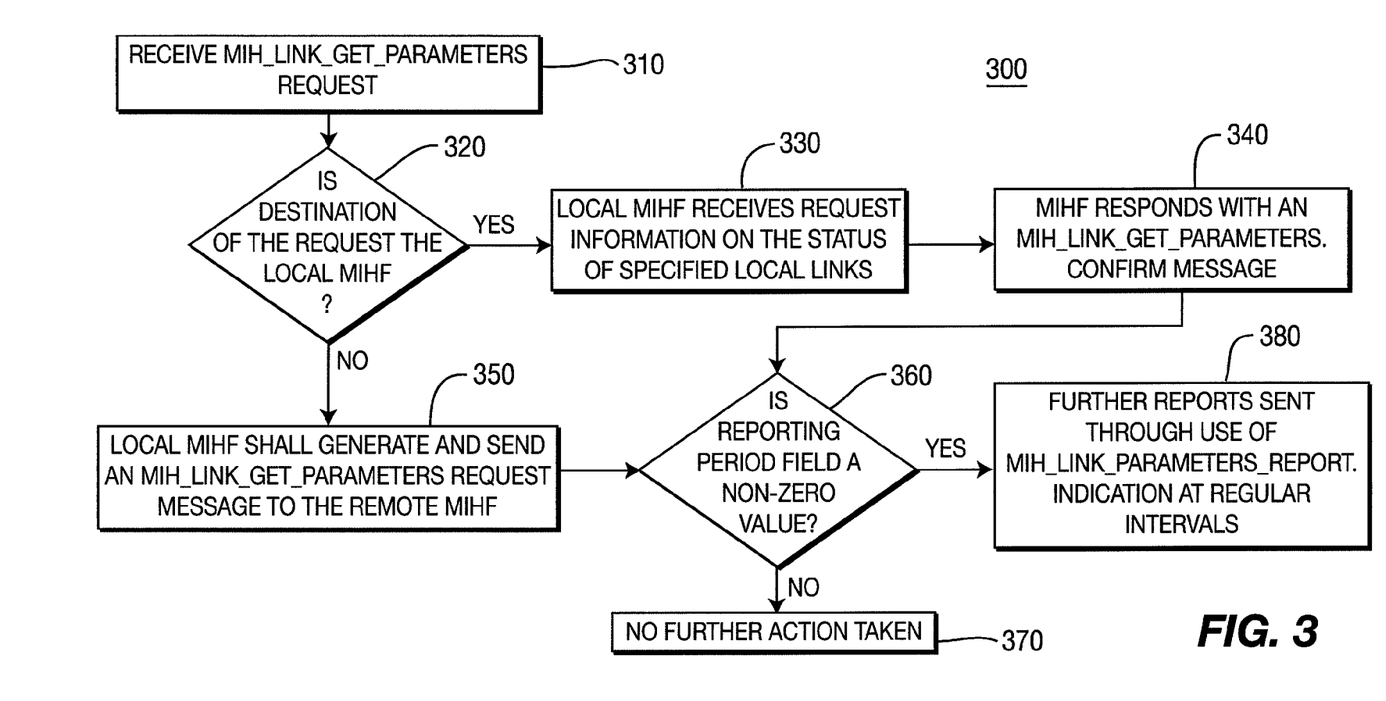
FIG. 3 is a flow diagram of a possible procedure implemented after receiving an MIH_Link_Get_Parameters request.

FIG. 3 is a flow diagram of an example procedure implemented after receiving a MIH_Link_Get_Parameters request 300. The effect of receipt of the MIH_Link_Get_Parameters request primitive 310 is that if the destination of the request is the local MIHF itself 320, the local MIHF shall get the requested information on the status of the specified local links 330 and respond with an MIH_Link_Get_Parameters.confirm 340. If the destination of the request is a remote MIHF 320, the local MIHF shall generate and send an MIH_Link_Get_Parameters request message to the remote MIHF 350.

Referring to FIG. 3, the effect of receipt of an updated MIH_Link_Get_Parameters Request primitive 310 further includes that if the ReportingPeriod field is set to "0" 360, no further action is to be taken 370. However, if the ReportingPeriod is set to a non-zero value 360, further reports can be sent through the use of the MIH_Link_Parameters_Report. indication at regular intervals specified in milliseconds by the ReportingPeriod field 380.

Table 1 below describes one possible embodiment of the parameters of the updated MIH_Link_Get_Parameters request primitive including a ReportingPeriod field.

TABLE 1

| Name | Type | Description |
|---|---|---|
| Destination Identifier | MIHF_ID | This identifies the local MIHF or a remote MIHF that will be the destination of this request. |
| Device States Request | DEV_STATES_REQ | (Optional) List of device states being requested. |
| Link Identifier List | LIST (LINK_ID) | List of link identifiers for which status is requested. If the list is empty, return the status of all available links. |
| Get Status Request Set | LINK_STATUS_REQ | Indicate which link status(es) is being requested. |
| Reporting Period | INTEGER(16) | Interval, in milliseconds, at which measurement reports are to be sent for the parameter specified by the GetStatusRequestSet. A value of "0" will cause a single report to be sent. |

The corresponding protocol message is to be updated accordingly through the addition of the ReportingPeriod TLV field.

Changing MIH Link Configure Thresholds Request Behavior

The existing MIH_Link_Configure_Thresholds request primitive is described as:

```
MIH_Link_Configure_Thresholds.request (
    DestinationIdentifier,
    LinkIdentifier,
    ConfigurationRequestList
)
```

In order to implement periodic reporting in this example, the existing primitive definition is updated to include a ReportingPeriod field:

```
MIH_Link_Configure_Thresholds.request (
    DestinationIdentifier,
    LinkIdentifier,
    ConfigurationRequestList
    ReportingPeriod
)
```

In another example, the ReportingPeriod field may be embedded in the ConfigurationRequestList field.

Figure 4:
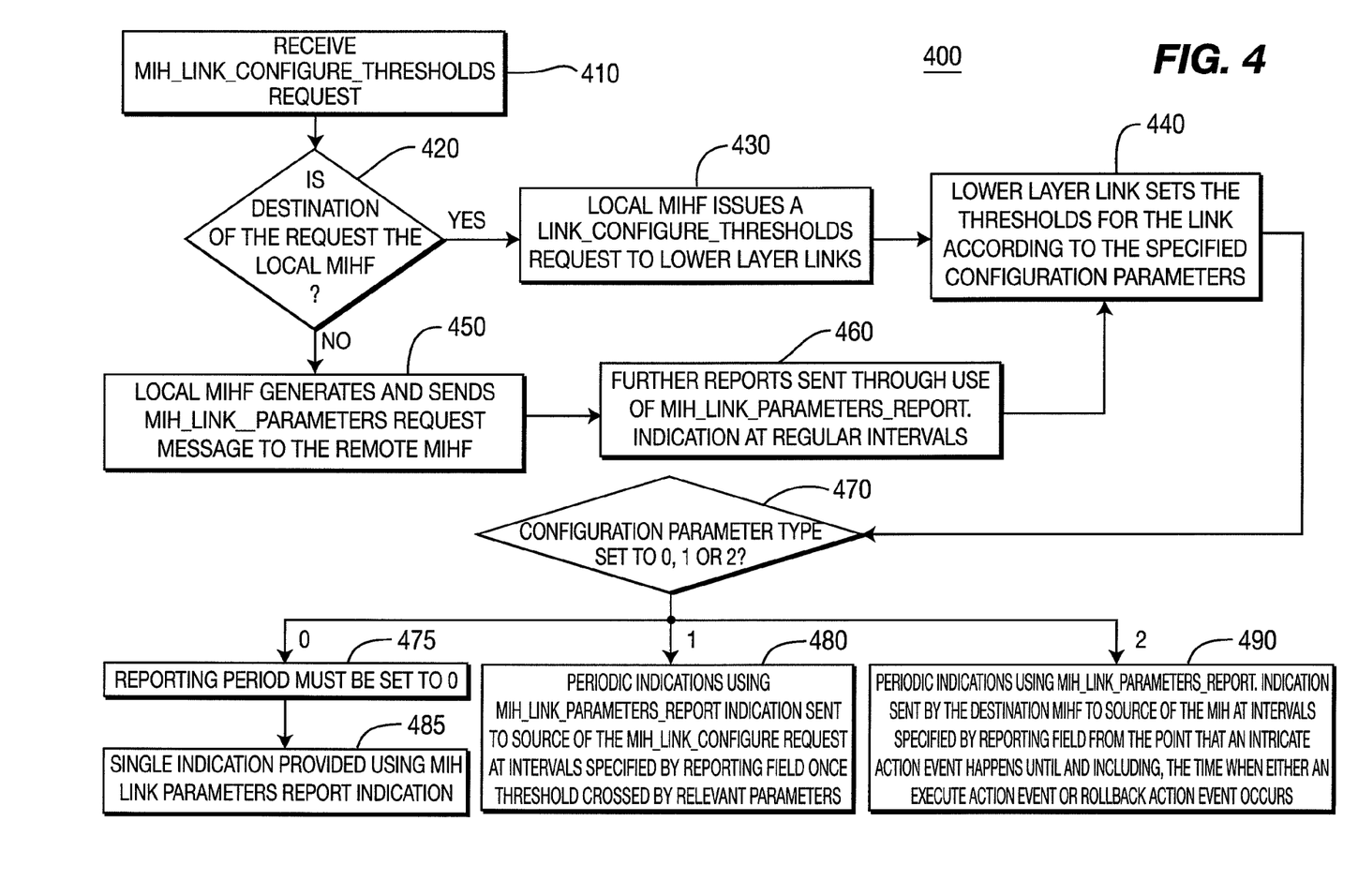
FIG. 4 is a flow diagram of a possible procedure implemented after receiving an MIH_Link_Configure request.

FIG. 4 is a flow diagram of an example procedure implemented after receiving an MIH_Link_Configure Thresholds request 400. The effect of receipt of the MIH_Link_Configure Thresholds request 410 is that if the destination of the request is the local MIHF itself 420, the local MIHF shall issue a Link_Configure_Thresholds request to the lower layer link 430 to set the thresholds for the link according to the specified configuration parameters 440. If the destination of the request is a remote MIHF 420, the local MIHF shall generate and send an MIH_Link_Configure_Thresholds request message to the remote MIHF 450. Upon the receipt of the message, the remote MIHF shall then issue a Link_Configure_Thresholds request to the lower layer link 460 to set the thresholds for the link according to the specified configuration parameters.

Referring to FIG. 4, the effect of receipt of an updated MIH_Link_Configure_Thresholds primitive 410 further includes that if the ConfigurationRequestList has the ConfigurationParameterType set to "0" 470, the ReportingPeriod MUST be set to "0" 475. If the ConfigurationParameterType is set to "1: Link QoSParameterList" 470, periodic indications can be sent to the source of the MIH_Link_Configure request at the intervals specified in milliseconds by the ReportingPeriod field once the threshold is crossed by the relevant parameters 480. If the ReportingPeriod field is set to "0" 475, only a single indication should be provided 485. In all cases, indications are to be provided using the MIH_Link_Parameters Report Indication. If the ConfigurationParameterType is set to "2: Link Configure Parameter List" 470, periodic indications are to be sent by the destination MIHF to the source MIHF (of the MIH Configure Link request), at the intervals specified in milliseconds by the ReportingPeriod field from the point that an InitiateAction event happens until, and including, the time when either an ExecuteAction event or Rollback Action event happens 490. If the Reporting Period is set to "0", only a single indication is to be sent for each event.

Table 2 below describes the parameters of the updated MIH_Link_Configure_Thresholds request primitive including a Reporting Period field.

TABLE 2

| Name | Type | Description |
| --- | --- | --- |
| Destination Identifier | MIHF_ID | This identifies the local MIHF or a remote MIHF that will be the destination of this request. |
| Link Identifier | LINK_TUPLE_ID | Identifier of the link to be configured. |
| Configure Request List | LIST(LINK_CFG_PARAM) | A list of link threshold parameters. |
| Reporting Period | INTEGER(16) | Interval, in milliseconds, at which measurement reports are to be sent for the parameter specified by the ConfigurationParameterValue field. A value of "0" will cause a single report to be sent upon thresholds' being crossed. |

The corresponding protocol message is to be updated accordingly through the addition of the ReportingPeriod TLV field.

Configuring a Measurement Report on the Link Layer Device

This section describes two possible examples for incorporating the relevant existing primitives of the LINK_SAP under the MIH framework.

Changing Link Get Parameters Request Behavior

The existing Link_Get_Parameters request primitive is described as:

```
Link_Get_Parameters.request (
    LinkParametersRequest,
    LinkStatesRequest,
    LinkDescriptorsRequest
)
```

In order to implement periodic reporting in this example, the existing primitive definition is updated to include a ReportingPeriod field:

```
Link_Get_Parameters.request (
    LinkParametersRequest,
    LinkStatesRequest,
    LinkDescriptorsRequest,
    ReportingPeriod
)
```

Figure 5:
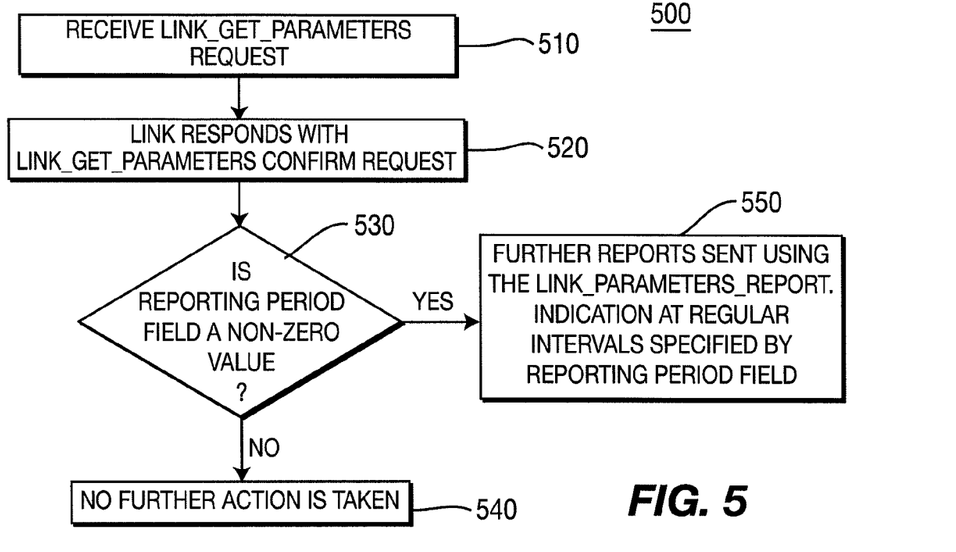
FIG. 5 is a flow diagram of a possible procedure implemented after receiving an MIH_Link_Get_Parameters request.

FIG. 5 is a flow diagram of a possible procedure implemented after receiving a Link_Get_Parameters request 500. The effect of receipt of the Link_Get_Parameters request 510 is that the recipient link shall respond with Link_Get_Parameters.confirm primitive 520.

Referring to FIG. 5, the effect of receipt of an updated Link_Get_Parameters request 510 further includes that if the ReportingPeriod field is set to "0" 530, no further action is to be taken 540. However, if the ReportingPeriod is set to a non-zero value 530, further reports can be sent through the use of the Link_Parameters_Report.indication at regular intervals specified in milliseconds by the ReportingPeriod field 550.

Table 3 below describes the parameters of the updated Link_Get_Parameters request primitive including a ReportingPeriod field.

TABLE 3

| Name | Type | Description |
| --- | --- | --- |
| Link Parameters Request | LIST(LINK_PARAM_TYPE) | A list of link parameters for which status is requested. |
| Link States Request | LINK_STATES_REQ | The link states to be requested. |
| Link Descriptors Request | LINK_DESC_REQ | The link descriptors to be requested. |
| Reporting Period | INTEGER(16) | Interval, in milliseconds, at which measurement reports are to be sent for the parameter specified by the LinkParametersRequest field. A value of "0" will cause a single report to be sent upon request. |

Changing Link Configure Thresholds Request Behavior

The existing Link_Configure_Thresholds request primitive is described as:

```
Link_Configure_Thresholds.request (
    LinkConfigureParameterList
)
```

In order to implement periodic reporting in this example, the existing primitive definition is updated to include a ReportingPeriod field:

```
Link_Configure_Thresholds.request (
    LinkConfigureParameterList
    ReportingPeriod
)
```

Figure 6:
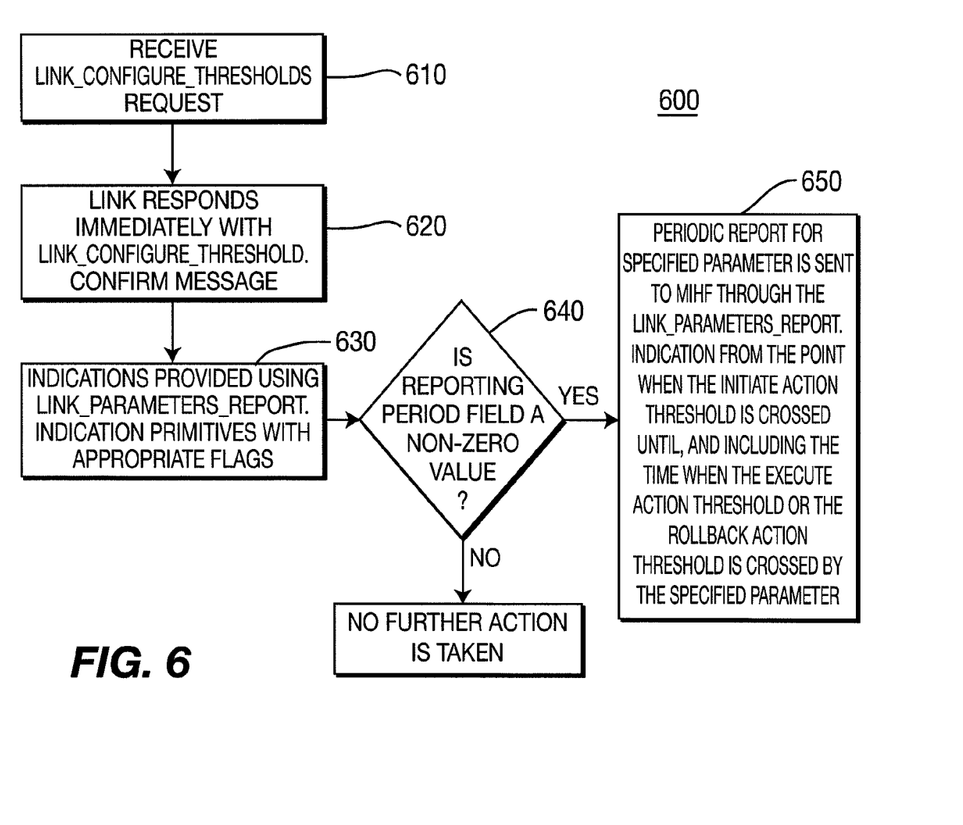
FIG. 6 is a flow diagram of a possible procedure implemented after receiving a Link_Configure_Thresholds request.

FIG. 6 is a flow diagram of the procedure implemented after receiving a Link_Configure_Thresholds request 600. The effect of receipt of the Link_Configure_Thresholds request 610 is that the recipient responds immediately with the Link_Configure_Threshold.confirm primitive 620.

Referring to FIG. 6, the effect of receipt of an updated Link_Configure_Thresholds request 610 further includes that indications must be provided through Link_Parameters_Report.indication primitives. In addition, if the ReportingPeriod field is set to any value other than "0" 640, the periodic report for the specified parameter is sent to the MIHF through the Link_Parameters_Report.indication from the point when the InitiateActionThreshold is crossed until, and including, the time when either the ExecuteActionThreshold or the RollbackActionThreshold is crossed by the specified parameter 650. If the ReportingPeriod field is set to "0" 640, no further action is taken 660.

Table 4 below describes the parameters of the updated Link_Configure_Thresholds request primitive including a ReportingPeriod field.

TABLE 4

| Name | Type | Description |
| --- | --- | --- |
| Link Configure Parameter List | LIST(LINK_CFG_PARAM) | A list of link threshold parameters. |
| Reporting Period | INTEGER(16) | Interval, in milliseconds, at which measurement reports are to be sent for the parameter specified by the LinkConfigureParameterList. A value of "0" will cause a single report to be sent upon thresholds' being crossed. |

Enhancing Link Actions to Address Further Deficiencies

This section shows how to incorporate the mechanisms associated with clearing previously set conditions on layer N by layer N+1 in order to trigger measurement reports in a conditional fashion, disabling or stopping measurement reports from layer N to layer N+1 until further requests are made, and enabling measurement reports from layer N to layer N+1.

Fundamentally, this can be achieved by adding three functionalities to the primitives for link actions. The first function is the LINK_CLEAR_THRESHOLDS primitive which clears any previously set conditions (e.g., thresholds on parameters) for triggering reporting of measurements from layer N to layer N+1 in the 802.21 framework. The second function is the LINK_DISABLE_PARAMETERS_REPORTS primitive which stops all periodic parameters report indications until further queries are made. The third function is the LINK_ENABLE_PARAMETERS_REPORTS primitive which starts periodic parameters report indications once a request is made or set conditions (e.g. threshold-crossing) are satisfied.

The Link Action Set element is currently defined as:

| Type | Length | Value |
| --- | --- | --- |
| 102 | 4 | Bit 0: LINK_DISCONNECT |
| | | Bit 1: LINK_LOW_POWER |
| | | Bit 2: LINK_POWER_DOWN |
| | | Bit 3: LINK_NO_ACTION |
| | | Bit 4: LINK_RESOURCE_RETAIN |
| | | Bit 5: DATA_FORWARDING_REQUEST |
| | | Bit 6: LINK_POWER_UP |
| | | Bit 7-31: (Reserved) |

The Modified Link Action Set element is defined as:

| Type | Length | Value |
| --- | --- | --- |
| 102 | 4 | Bit 0: LINK_DISCONNECT |
| | | Bit 1: LINK_LOW_POWER |
| | | Bit 2: LINK_POWER_DOWN |
| | | Bit 3: LINK_NO_ACTION |
| | | Bit 4: LINK_RESOURCE_RETAIN |
| | | Bit 5: DATA_FORWARDING_REQUEST |
| | | Bit 6: LINK_POWER_UP |
| | | Bit 7: LINK_CLEAR_THRESHOLDS |
| | | Bit 8: LINK_DISABLE_PARAMETERS_REPORTS |
| | | Bit 9: LINK_ENABLE_PARAMETERS_REPORTS |
| | | Bit 10-31: (Reserved) |

Figure 7:
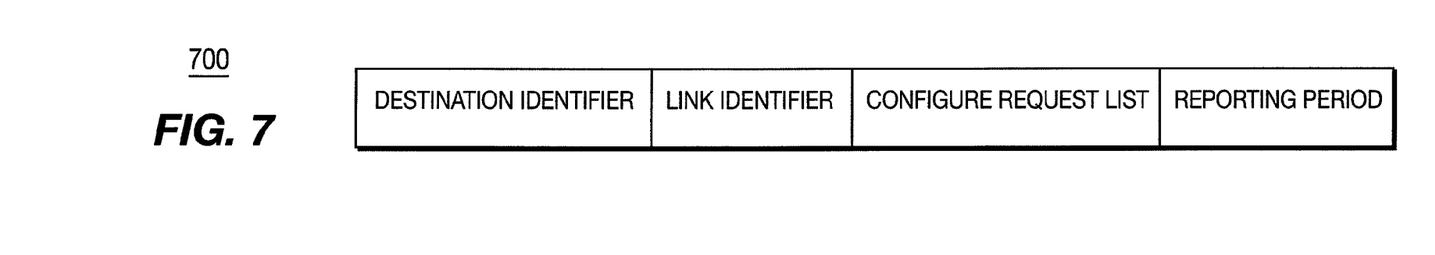
FIG. 7 is a diagram of a MIH_Link_Configure_Thresholds request message.

FIG. 7 is an example of a service message 700. The example shown in FIG. 7 represents a MIH_Link_Configure_Thresholds request message.

The procedures 300, 400, 500, and 600 of FIGS. 3, 4, 5 and 6 the local and remote MIHFs may be located in a WTRU 205, an AP 210, or some other network entity such as an access router (not shown). Optionally, the procedures 300, 400, 500, and 600 of FIGS. 3, 4, 5 and 6 may be performed so that the AP may request the MIH protocol of the WTRU 205, and the WTRU 205 may generate and send an MIH measurement report to the AP 210 with information relating to the MIH capabilities of the WTRU 205.

Although the features and elements are described in the preferred embodiments in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in a wireless transmit/receive unit (WTRU), the method comprising:
   an inter-system handover support entity receiving a first measurement configuration message including a list of link threshold parameters for indicating thresholds for a plurality of links associated with a plurality of different radio access technologies, a time interval field for periodic measurement reporting, and a reporting field, wherein a value of the reporting field indicates one of: that a single measurement report should be sent once on a condition that a threshold is crossed or a plurality of periodic measurement reports should be transmitted periodically, wherein each of the periodic measurement reports is separated by the time interval;
   the inter-system handover support entity sending a second measurement configuration message to at least one link layer device to configure the link layer device for either single measurement reporting or periodic measurement reporting;
   the inter-system handover support entity receiving a first measurement report from the link layer device; and
   the inter-system handover support entity sending a second measurement report based on the first measurement report received from the link layer device.

2. The method of claim 1, wherein the first measurement configuration message is an MIH_Link_Configure_Thresholds.request message.

3. The method of claim 2, wherein the time interval field is included in a ConfigureRequestList field in the MIH_Link_Configure_Thresholds.request message.

4. The method of claim 2, wherein the second measurement configuration message is a Link_Configure_Thresholds.request primitive based on the MIH_Link_Configure_Thresholds.request message to the link layer device.

5. The method of claim 1, wherein the measurement report is an MIH_Link_Parameters_Report.indicaton message.

6. A method for use in a wireless transmit/receive unit (WTRU), the method comprising:
   an inter-system handover support entity receiving a first measurement configuration message including a list of link threshold parameters for indicating thresholds for a plurality of links associated with a plurality of different radio access technologies, a time interval field for periodic measurement reporting, and a reporting field, wherein a value of the reporting field indicates one of: that a single measurement report should be sent once on a condition that a threshold is crossed or a plurality of measurement reports should be transmitted periodically, wherein each of the periodic measurement reports is separated by the time interval;
   the inter-system handover support entity sending a second measurement configuration message to at least one link layer device to configure the link layer device for either single measurement reporting or periodic measurement reporting;
   the inter-system handover support entity receiving a first measurement report from the link layer device; and
   the inter-system handover support entity sending a second measurement report based on the first measurement report received from the link layer device.

7. The WTRU of claim 6, wherein the first measurement configuration message is an MIH_Link_Configure_Thresholds.request message.

8. The WTRU of claim 7, wherein the time interval field is included in a ConfigureRequestList field in the MIH_Link_Configure_Thresholds.request message.

9. The WTRU of claim 7, wherein the second measurement configuration message is a Link_Configure_Thresholds.request primitive based on the MIH_Link_Configure_Thresholds.request message to the link layer device.

10. The WTRU of claim 6, wherein the measurement report is an MIH_Link_Parameters_Report.indication message.

* * * * *